United States Patent
Ogushi et al.

(10) Patent No.: US 8,081,352 B2
(45) Date of Patent: Dec. 20, 2011

(54) IMAGE READING/RECORDING APPARATUS

(75) Inventors: Hiroshi Ogushi, Shiroi (JP); Nozomu Nishiberi, Yokohama (JP); Masaaki Ishihara, Kawasaki (JP); Tetsuya Saito, Yokohama (JP); Nobuhiro Toki, Kawasaki (JP); Masahiro Kawanishi, Kawasaki (JP); Tomoko Ueno, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 11/487,359

(22) Filed: Jul. 17, 2006

(65) Prior Publication Data
US 2007/0019252 A1 Jan. 25, 2007

(30) Foreign Application Priority Data
Jul. 21, 2005 (JP) ................. 2005-211223

(51) Int. Cl.
*H04N 1/21* (2006.01)
*H04N 1/04* (2006.01)
*G03G 15/00* (2006.01)
*G03B 27/04* (2006.01)

(52) U.S. Cl. ........ 358/474; 358/296; 399/107; 399/381; 355/128; 355/130

(58) Field of Classification Search ............ 358/296, 358/474; 399/144, 151, 319, 380, 381, 392, 399/107, 125; 355/181, 93, 101, 128, 130
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,359,435 A | 10/1994 | Hayashi et al. | 358/498 |
| 5,621,501 A * | 4/1997 | Matsuo et al. | 355/75 |
| 5,680,166 A | 10/1997 | Nishiberi | 347/108 |
| 5,860,044 A * | 1/1999 | Eki et al. | 399/125 |
| 6,100,963 A * | 8/2000 | Hosaka | 355/75 |
| 6,426,803 B1 * | 7/2002 | Sasai et al. | 358/400 |
| 6,559,977 B2 | 5/2003 | Sasai et al. | 358/400 |
| 7,108,368 B2 | 9/2006 | Saito et al. | 347/104 |
| 7,681,984 B2 | 3/2010 | Saito et al. | |
| 2005/0270354 A1 | 12/2005 | Taguchi et al. | 347/104 |
| 2007/0002118 A1 | 1/2007 | Saito et al. | 347/104 |

FOREIGN PATENT DOCUMENTS

| | | |
|---|---|---|
| JP | 59-123670 | 7/1984 |
| JP | 59-138461 | 8/1984 |
| JP | H03-098060 | 4/1991 |

(Continued)

*Primary Examiner* — Benny Tieu
*Assistant Examiner* — Ngon Nguyen
(74) *Attorney, Agent, or Firm* — Fitzpatrick, Cella, Harper & Scinto

(57) ABSTRACT

An image reading/recording apparatus which can prevent a reading unit from closing abruptly and reduce the force required to open the reading unit is to be provided. The apparatus is equipped with a damper unit which links the apparatus body and the scanner unit and the working direction of whose force is reversed on the way of the turning of the scanner unit, and a metal-made supporting member which is arranged in the apparatus body and supports the damper unit in a state in which the scanner unit is closed relative to the apparatus body.

5 Claims, 13 Drawing Sheets

FOREIGN PATENT DOCUMENTS

| | | |
|---|---|---|
| JP | H07-244410 | 9/1995 |
| JP | H09-311389 | 12/1997 |
| JP | 2001105687 A | 4/2001 |
| JP | 03628581 A | 9/2001 |
| JP | 2005136474 A | 5/2005 |

* cited by examiner

IMAGE READING/RECORDING APPARATUS

BACKGROUND OF THE INVENTION

1. Field of the Invention

The present invention relates to an image reading/recording apparatus, such as a facsimile machine, a copying machine and a multifunction machine, equipped with a recording unit and an image reading unit, and more particularly to the opening/closing configuration for the image reading unit.

2. Description of the Related Art

Conventional such configurations include one disclosed in Japanese Utility Model Application Laid-Open No. H03-098060, which is a clam shell type image formation apparatus having an upper unit openably supported by a pivoting device on one side of a lower unit, wherein a subject copy mount held by a spring force is locked by a locking mechanism when the mount is closed, and the locked state is in such a position that the subject copy mount is held horizontally. Japanese Patent Application Laid-Open No. H07-244410 contains a description of a control mechanism for an opening/closing member so configured that it has a reversing guide 3 disposed to be turnable around a rotational center shaft F, a spring engaged with the reversing guide 3, and a turnable damper 64 fitted to the fulcrum of the reversing guide 3. Japanese Patent Application Laid-Open No. H09-311389 discloses a configuration of an opening/closing member for a subject copy pressing plate in which the member can be stopped and held at any desired closing angle within a prescribed range and can be dropped by a spring force from a prescribed closing angle.

However, the configuration described in Japanese Utility Model Application Laid-Open No. H03-098060 requires a locking mechanism when the subject copy mount is closed, inviting an increase in body size. Moreover, as a force is always in the opening direction when it is locked, the surrounding parts should be composed of sheet metal or the like instead of plastics, which means an extra cost.

The configuration disclosed in Japanese Patent Application Laid-Open No. H07-244410 requires working against the damper force when the cover is opened, resulting in a heavier opening action for the cover. Japanese Patent Application Laid-Open No. H09-311389 also has its own problem, in this case a heavier opening action for the subject copy mount as it has to be opened against its own weight and the damper force.

SUMMARY OF THE INVENTION

An object of the present invention, therefore, is to provide an image reading/recording apparatus which allows its reading unit to be kept closed without requiring a locking mechanism, can prevent the reading unit from closing abruptly and reducing the force required to open the reading unit.

Another object of the invention is to provide an image reading/recording apparatus equipped with a scanner unit which is opened and closed by turning relative to the apparatus body, further provided with a damper unit which links the apparatus body and the scanner unit and the working direction of whose force is reversed on the way of the turning of the scanner unit, and a metal-made supporting member which is arranged in the apparatus body and supports the damper unit in a state in which the scanner unit is closed relative to the apparatus body.

Further features of the present invention will become apparent from the following description of exemplary embodiments (with reference to the attached drawings).

DESCRIPTION OF THE EMBODIMENTS

Next, an image reading/recording apparatus, which is an embodiment of the present invention, will be described.

Figure 1:
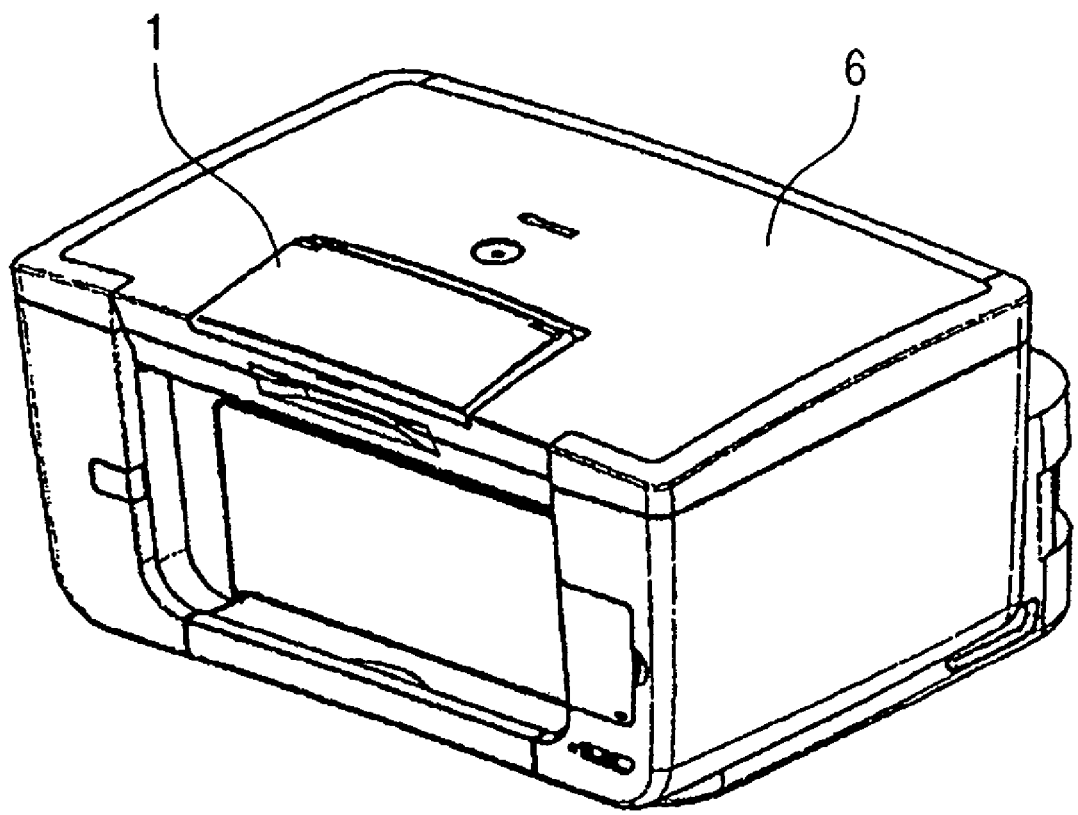
FIG. 1 shows a perspective view of an image reading/recording apparatus, which is an embodiment of the present invention.
Figure 2:
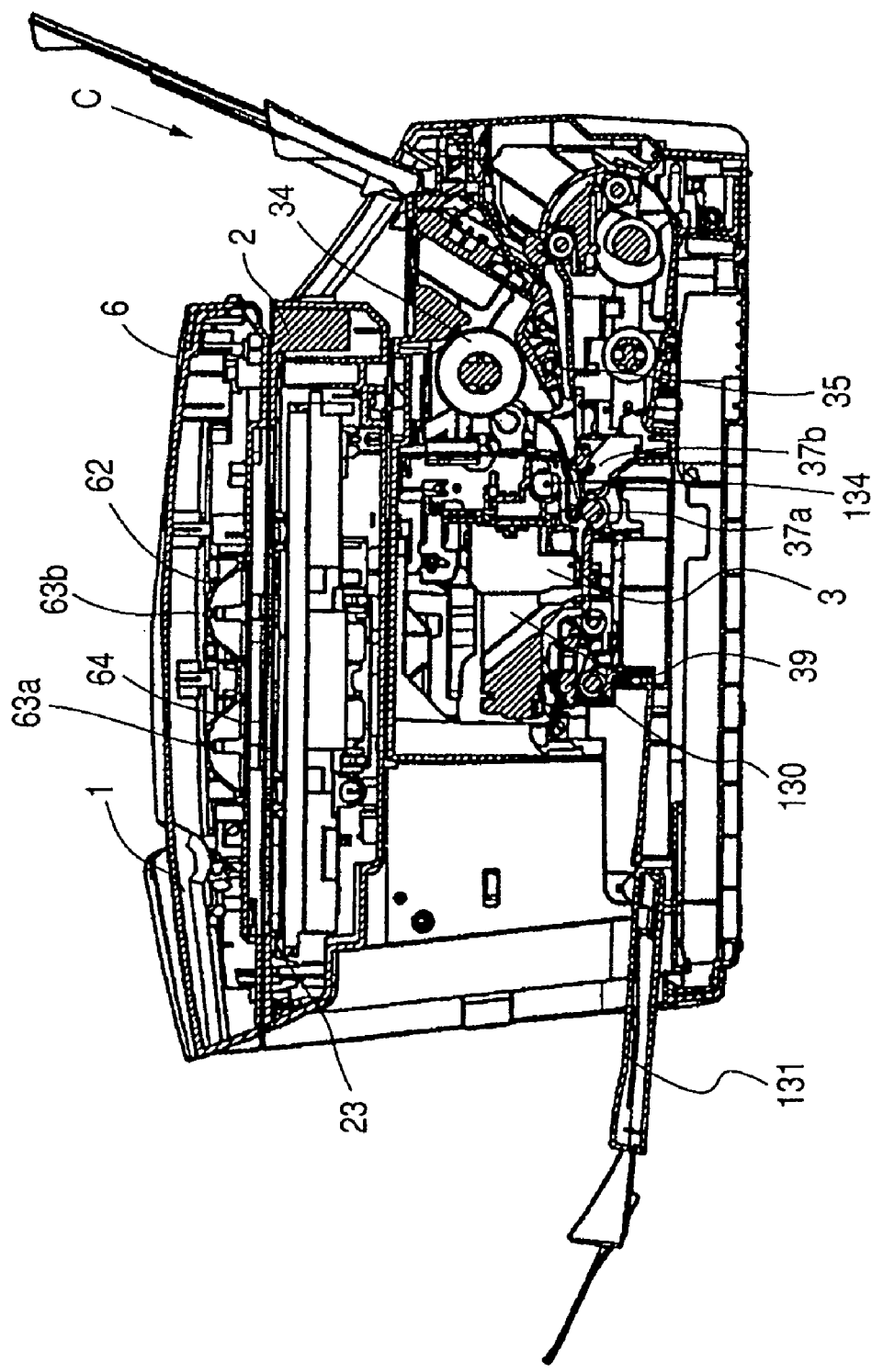
FIG. 2 shows a sectional view of the image reading/recording apparatus, which is the embodiment of the invention.

FIG. 1 shows a perspective view of the image reading/recording apparatus, which is the embodiment of the invention. FIG. 2 shows a sectional view of the image reading/recording apparatus embodying the invention. As shown in FIGS. 1 and 2, the image reading/recording apparatus mainly comprises a panel unit 1, a scanner unit 2, a recording unit 3, an electric board part 4 and an original sheet pressing plate unit 6.

Figure 3:
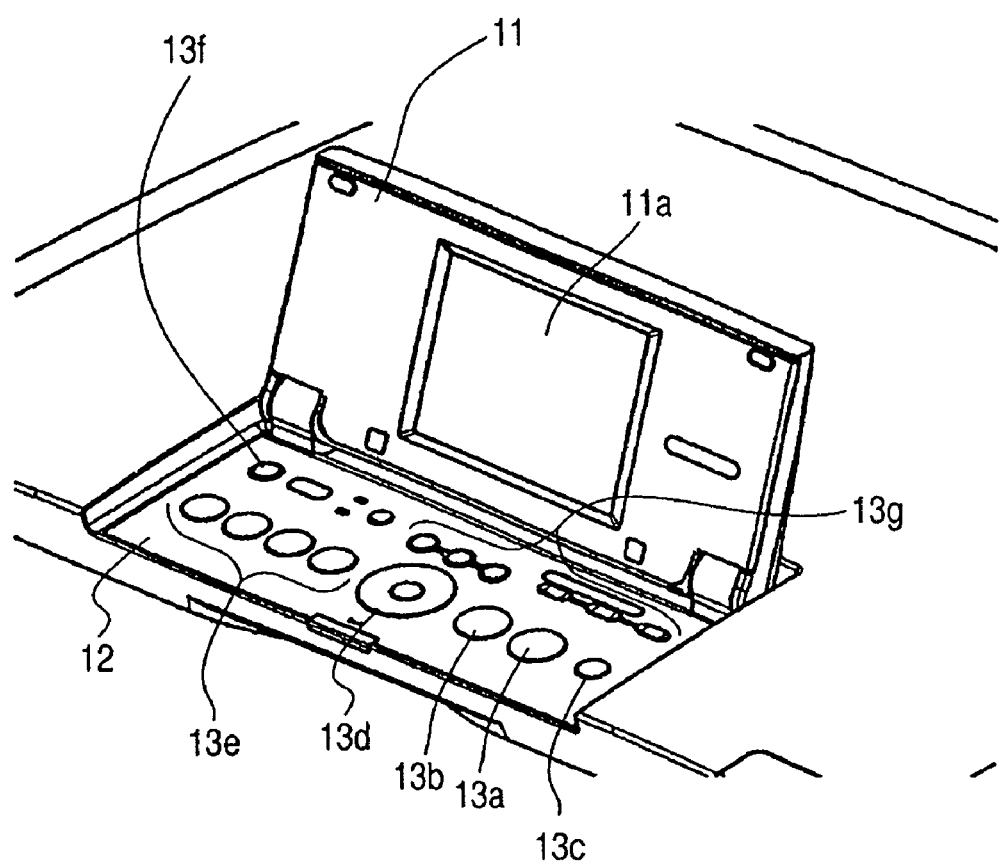
FIG. 3 shows a state in which an LCD unit is opened in the embodiment of the invention.
Figure 4:
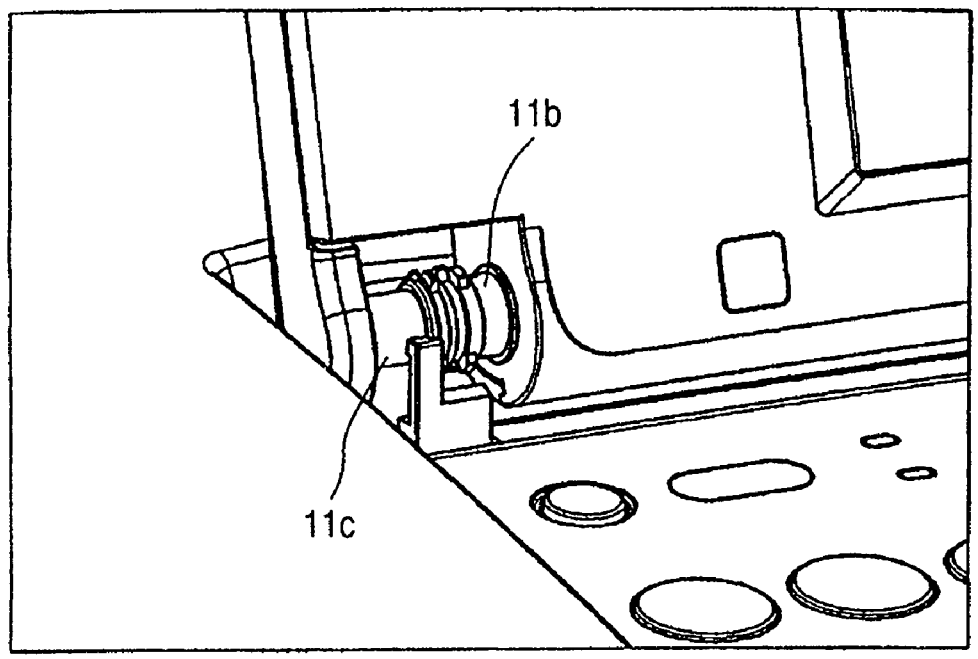
FIG. 4 illustrates the stopper of the LCD unit in the embodiment of the invention.
Figure 5:
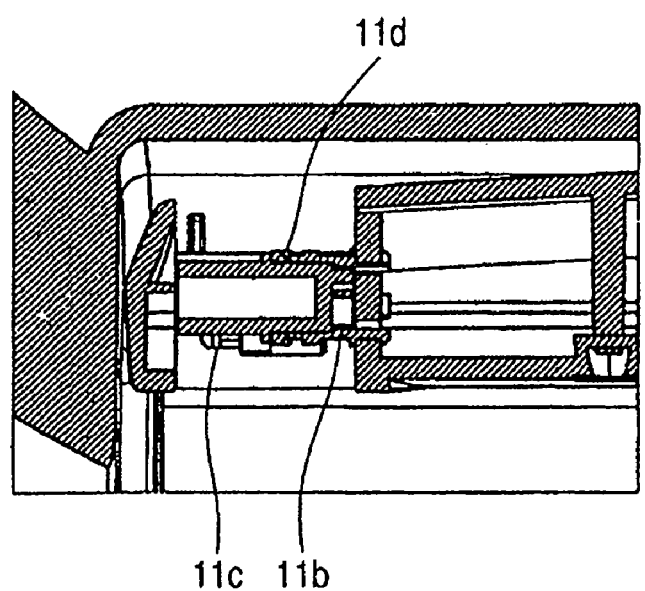
FIG. 5 shows a sectional view of the stopper of the LCD unit in the embodiment of the invention.
Figure 6:
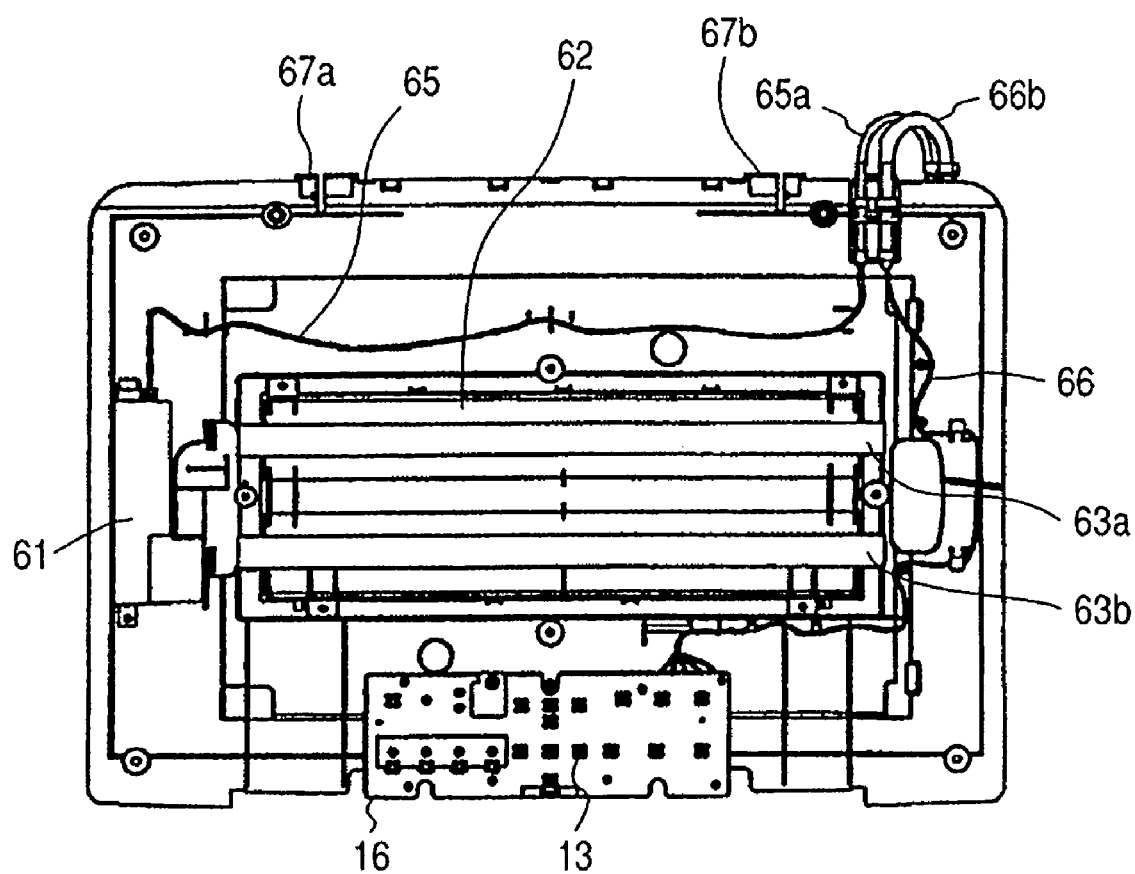
FIG. 6 shows a original sheet pressing unit containing a panel unit in the embodiment of the invention.

First, the panel unit 1 will be described. FIG. 3 shows a state in which an LCD unit 11 is opened in the embodiment of the invention; FIG. 4 illustrates the stopper of the LCD unit in the embodiment of the invention; FIG. 5 shows a sectional view of the stopper of the LCD unit in the embodiment of the invention; and FIG. 6 shows an original sheet pressing unit containing the panel unit 1 in the embodiment of the invention.

In the panel unit, as shown in FIG. 3, one or more each of color start key 13a, monochrome start key 13b, stop key 13c, cross key 13d, function selector key 13e, power switch key 13f and function key 13g are integrally configured and fitted to a panel cover 12. In FIG. 6 reference numeral 16 denotes a panel board, to which tact switches (not shown) are soldered in positions matching the keys 13. An LCD module and an electric board (neither shown) are built into the LCD unit 11, and a transparent LCD window 11a is fitted to its surface. The LCD unit 11, so configured as to be turnable around a hinge 11b, can be manipulated by the user.

Next, one example of operation of the image reading/recording apparatus will be described. The apparatus is operated by manipulating keys on the panel unit shown in FIG. 2. To describe the copying operation for instance, first the power switch key 13f is pressed; next, a copying key is selected with the function selector key 13e; the picture quality and the recording medium are selected with a menu key, and the number of copies is selected with an arrow key; after that, a pressing plate 21 is opened, and the subject copy from which copies are to be made is set on a glass plate 23; recording paper sheets are set in a recording paper tray 32; finally, after the color start key 13a is pressed if color copies are desired or the monochrome start key 13b is pressed if monochromic copies are desired. In this way, the keys on the panel unit 1 are so arranged that the operation can be accomplished in a natural way by pressing the applicable ones sequentially from left to right without the fear of skipping any necessary action.

While copying was taken up above as an example of operation, scanning from a PC connected by way of a USB can be accomplished by selecting scanning with the function selector key 13e at the beginning. Or if photo printing is selected, an image inserted into a card slot unit (not shown) can be directly recorded by the recording unit 3.

Further, as shown in FIGS. 4 and 5, the hinge 11b is fitted to the LCD unit 11, and a hinge bracket 11c is so configured on the panel unit body side as to enter into the hinge 11b. A spring lid is snapped into the part where the hinge 11b and the hinge bracket 11c overlap each other to squeeze this part. This arrangement gives friction when the LCD unit 11 is opened or closed to keep it at a prescribed angle.

As shown in FIG. 6, the panel unit 1 is integrally fitted to the original sheet pressing plate unit 6. Further, fluorescent lamps 63a and 63b, which are light sources for reading transmissive subject copies, an inverter 61 and a reflecting plate 62 are fitted to the original sheet pressing plate unit 6. The lighting of the fluorescent lamps 63a and 63b enables a film place on the subject copy glass plate 23 of the scanner unit 2 to be read.

Figure 9:
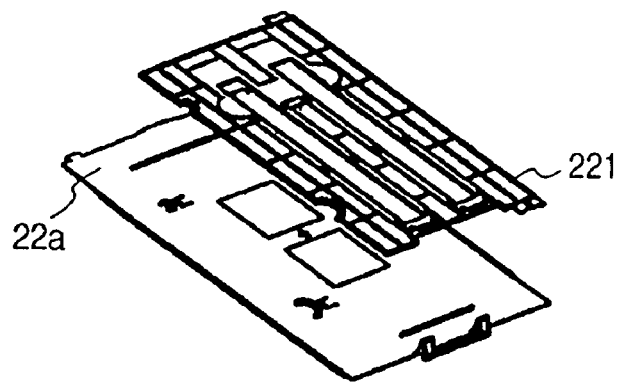
FIG. 9 shows the sponge frame in the embodiment of the invention.

As shown in FIG. 2, the panel unit 1 is so arranged over the reflecting plate 62 toward the front of the apparatus that it can be accommodating within the height of the reflecting plate 62. Further, as shown in FIG. 9, the wiring for these elements is divided into an the inverter line 65 for the inverter 61 and a panel line 66 for the panel unit 1, and arranged out of the original sheet pressing plate unit 6. The exposed parts of the wiring constitute covered wires 65a and 66b, which again entered into the apparatus through other holes bored in the apparatus. The original sheet pressing plate unit 6 can turn around pressing plate hinges 67a and 67b and movable up and down relative to a hole in the scanner unit 2 to be adaptable to a thick subject copy, which is a page of a bound book.

Figure 7:
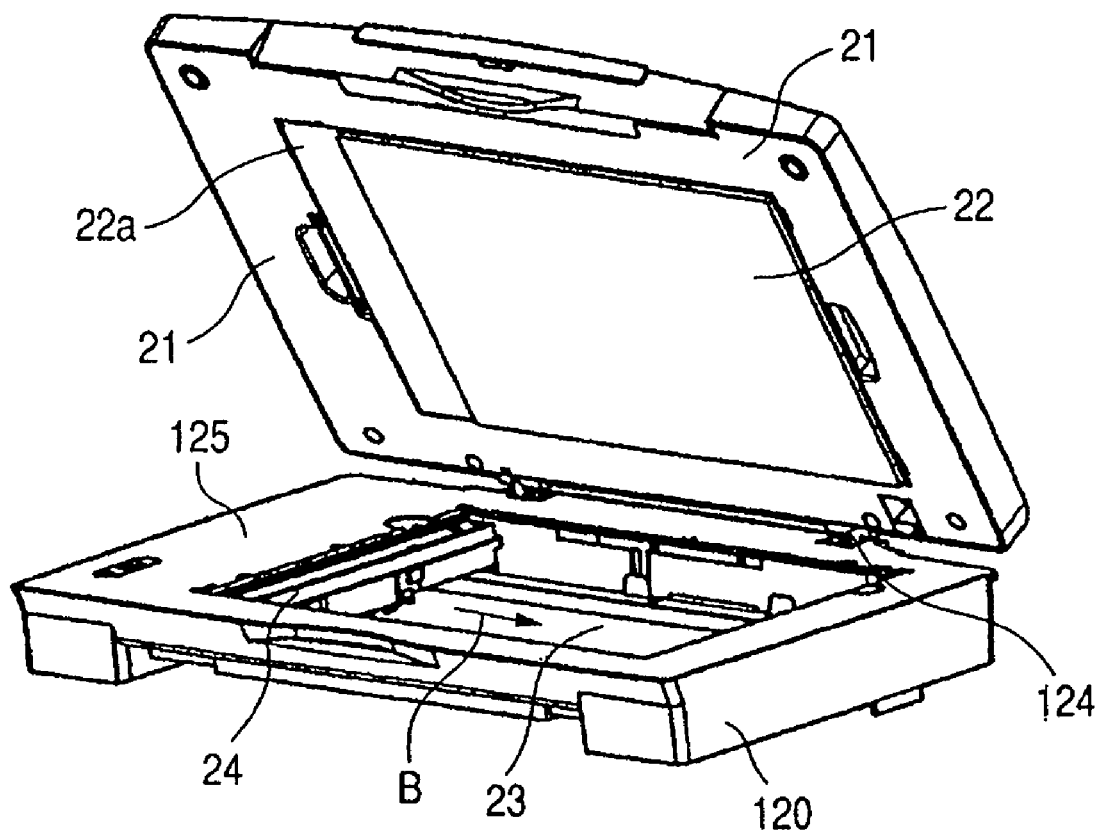
FIG. 7 shows a state in which a pressing plate of the image reading/recording apparatus, which is the embodiment of the invention, is opened.

Next, the scanner unit 2 will be described. FIG. 7 shows a state in which the pressing plate of the image reading/recording apparatus, which is the embodiment of the invention, is opened. Referring to FIG. 7, the glass plate 23 is pressed from above by a cover 125. A sponge frame 22a and a white sheet 22 are fitted to the pressing plate 21, which prevents the subject copy from rising. They are turnably fitted to the pressing plate 21 via a hinge 124. All these components are fitted to a scanner frame 120. A CCD reading unit 24 for reading images is driven in the direction of arrow B during the operation of scanning a hard copy or an image from a PC, and reads the subject copy through the glass plate 23.

Figure 8:
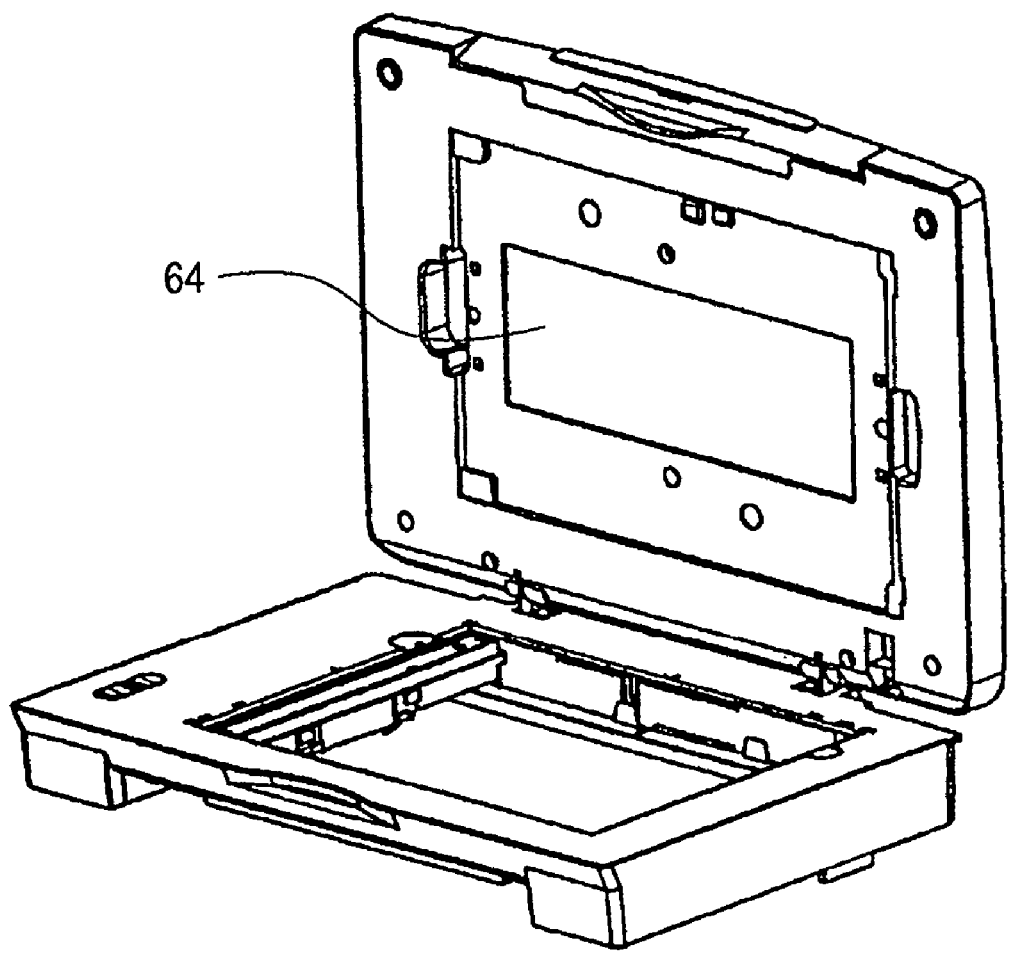
FIG. 8 shows a state in which a sponge frame of the image reading/recording apparatus, which is the embodiment of the invention, is detached.

Next, the operation to read a film will be described. The sponge frame 22a shown in FIG. 7 is detachable from the pressing plate 21. FIG. 8 shows a state of the image reading/recording apparatus embodying the invention in which the sponge frame is detached. By detaching the sponge frame 22a from the pressing plate 21, a diffusing plate 64 is exposed. FIG. 9 shows the sponge frame. A film guide 221 is accommodated in the sponge frame 22a, which is detachable.

Figure 10:
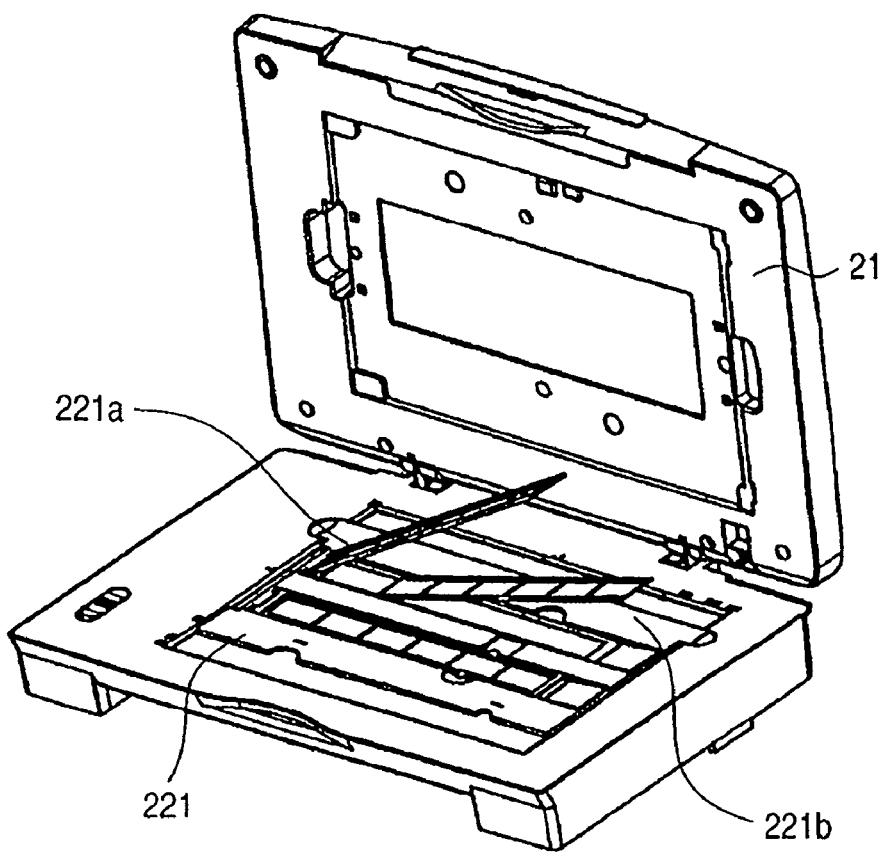
FIG. 10 shows a state in which a film guide is set into the image reading/recording apparatus, which is the embodiment of the invention.

FIG. 10 shows a state in which a film guide is set into the image reading/recording apparatus embodying the invention. As shown in FIG. 10, the detached film guide 221 is set onto the glass plate 23. Then, a fixing member 221a is raised, a negative film 221b is set, and the fixing member 221a is lowered and fixed. After that, the pressing plate 21 is closed, and the apparatus is now ready to read the film.

Figure 11:
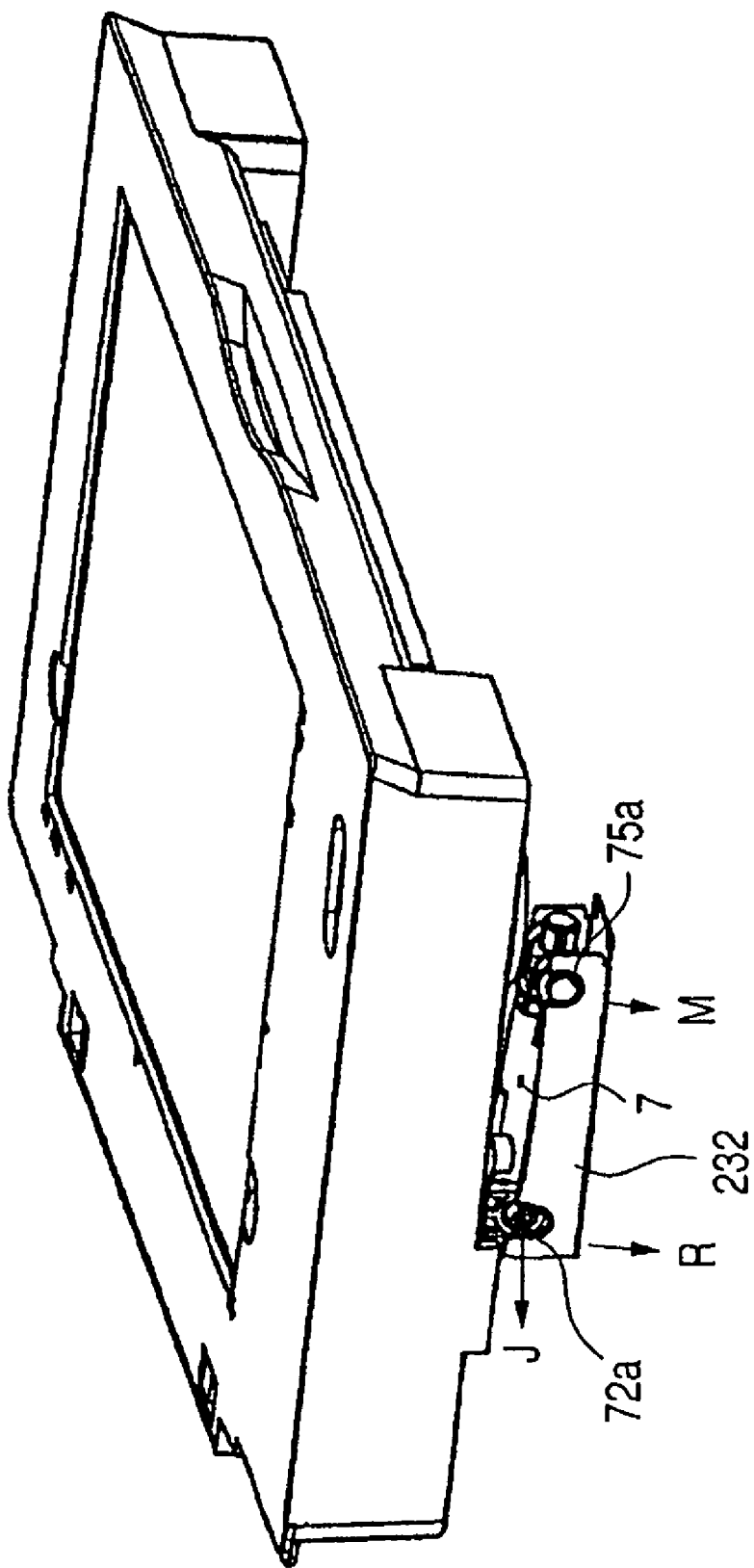
FIG. 11 shows a state in which a scanner unit of the image reading/recording apparatus, which is the embodiment of the invention, is closed.
Figure 12:
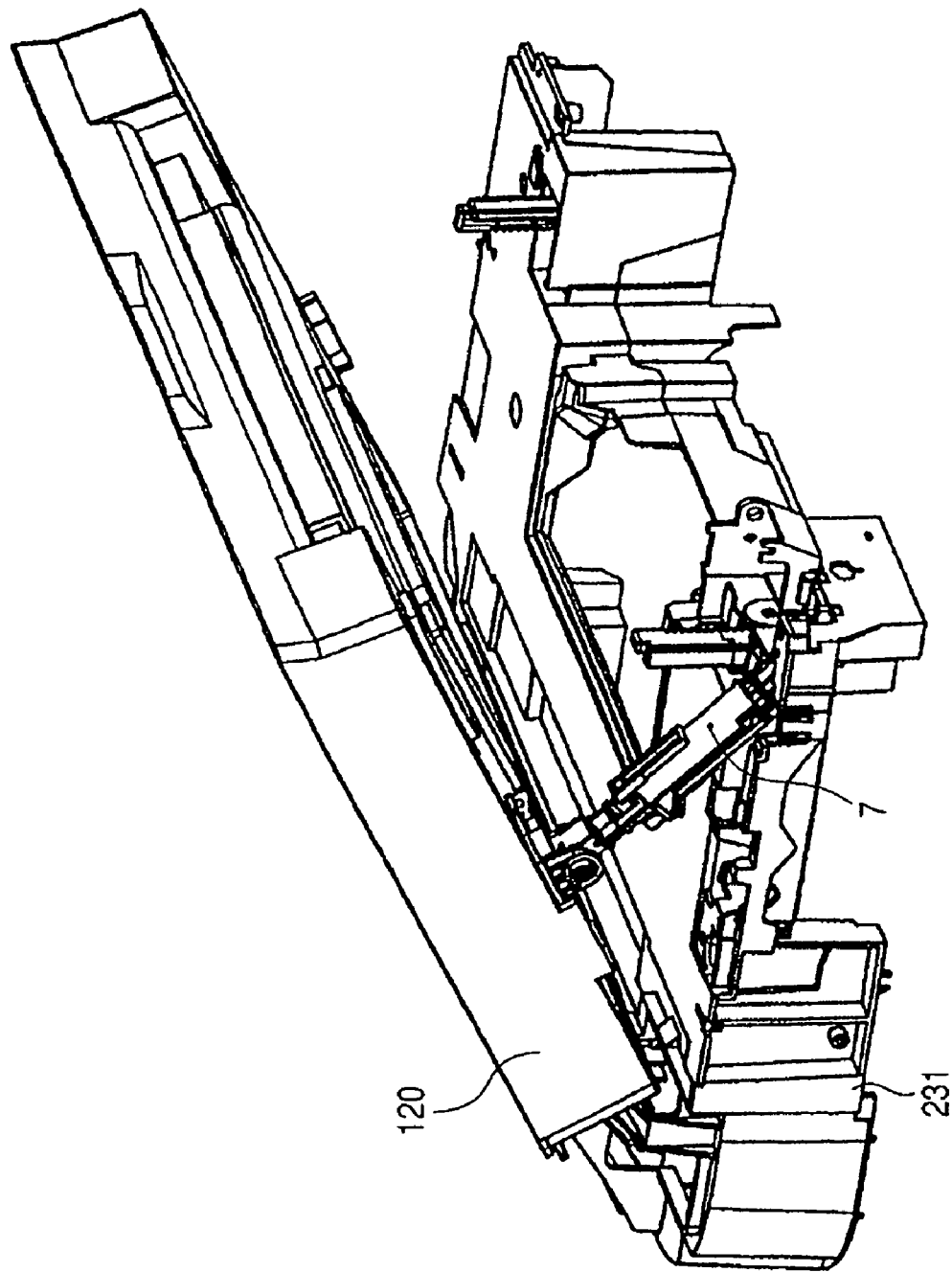
FIG. 12 shows a state in which the scanner unit of the image reading/recording apparatus, which is the embodiment of the invention, is opened.

Next, the structure of fitting the scanner unit 2 to the apparatus body will be described. FIG. 11 shows a state of the image reading/recording apparatus embodying the invention in which the scanner unit is closed. FIG. 12 shows a state of the image reading/recording apparatus embodying invention in which the scanner unit is opened. As shown in FIGS. 11 and 12, a damper unit 7 is fitted to the scanner unit 2 on the left side as viewed from before the apparatus. Referring to FIG. 12, the hinged part of the scanner frame 120 is in a bearing part 231b of a middle frame 231. Anti-shock units are fitted to the middle frame 231 on the right and left sides as viewed from before the apparatus.

Figure 13:
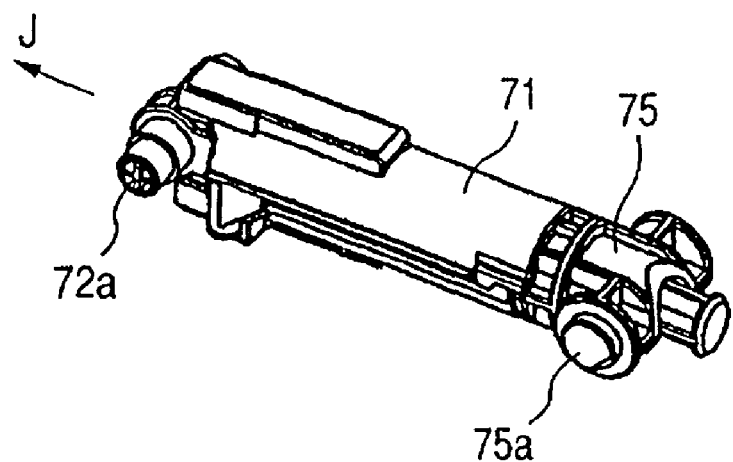
FIG. 13 shows an external perspective view of a damper unit in the embodiment of the invention.
Figure 14:
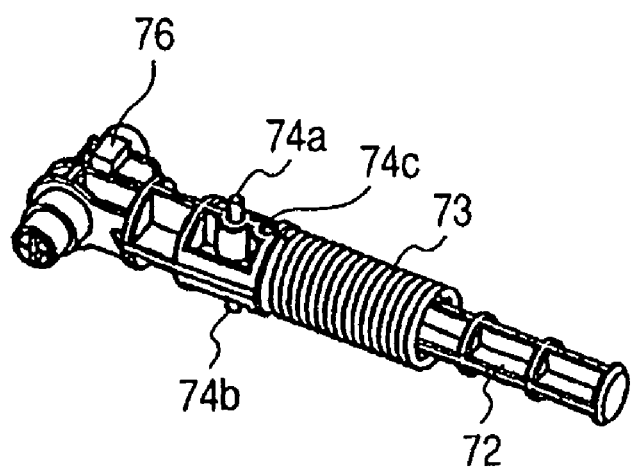
FIG. 14 shows a perspective view of the internal structure of the damper unit in the embodiment of the invention.

Now will be described the configuration of the damper unit 7. FIG. 13 shows an external perspective view of the damper unit in the embodiment of the invention and FIG. 14, a perspective view of the internal structure of the damper unit in the embodiment of the invention. Referring to FIG. 13, with a cover 71 and a damper base 75 removed, the damper unit 7 is configured of a damper arm 72, spring pins 74a and 74b pressed into the damper arm 72 and a compression spring 73. In the state shown in FIG. 13, an extending force is working in the direction of arrow J, and the spring pins 74a and 74b in a somewhat extended state engage with the cover 71 to stop it. Also, the spring pins can be inserted into the position denoted by 74c to enable the stroke to be adjusted. A damper rubber 76 is fitted to the cover 71, and receives it when the spring pin 74a is extended by the compression spring 73. The presence of this damper rubber 76 serves to reduce noise and to protect the cover from damages.

Figure 15:
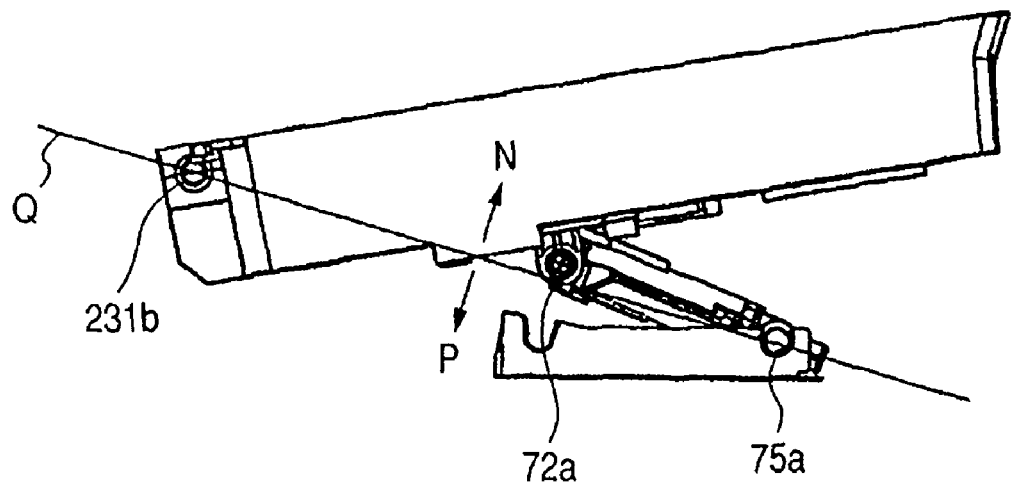
FIG. 15 illustrates the configuration of the damper unit in the embodiment of the invention.

FIG. 15 illustrates the configuration of the damper unit in the embodiment of the invention. The shaft part 72a of the damper arm is turnably engaged with the scanner unit 2. The shaft part 75a of the damper base 75 is turnably engaged with the middle frame 231.

Referring to FIG. 15, when the damper unit 7 is above a line Q connecting the bearing part 231b which engages the hinged part of the scanner frame 120 of the middle frame 231 and the shaft part 75a of the damper base 75, there is a force working on the scanner unit 2 in the direction of arrow N in the illustration, or when the damper unit 7 is below the line, a force works on the scanner unit 2 in the direction of arrow P therein. Thus, there is a relationship of toggle with the line Q as the boundary.

Figure 16:
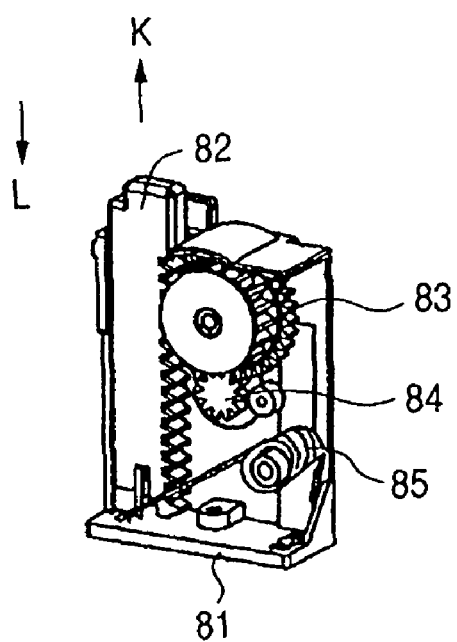
FIG. 16 shows a perspective view of an anti-shock unit in the embodiment of the invention.

Next, an anti-shock unit will be described. FIG. 16 shows a perspective view of the anti-shock unit in the embodiment of the invention. The anti-shock unit has a configuration in which an oil damper 84, a gear 83, an arm 82 and a torsion coil spring 85 are fitted to a base 81. Referring to FIG. 16, the arm 82 is thrust up by the torsion coil spring 85 in the direction of arrow K. When a force is applied in the direction of arrow L, it is accelerated through the gear 83, works on the oil damper 84 and meets resistance.

Referring to FIG. 11, though the damper unit 7 tends to extended in the direction of J, the aforementioned toggle relations causes a force to work in the direction of R. The shaft part 75a of the damper base 75 supported by the middle frame 231 is also subjected to a force in the direction of M. Since both the shaft part 72a of the damper arm 72 and the shaft part 75a of the damper base 75 are supported by a metal-made supporting member 232 but not by a plastic member, there is no fear of creep deformation of the like.

Figure 17:
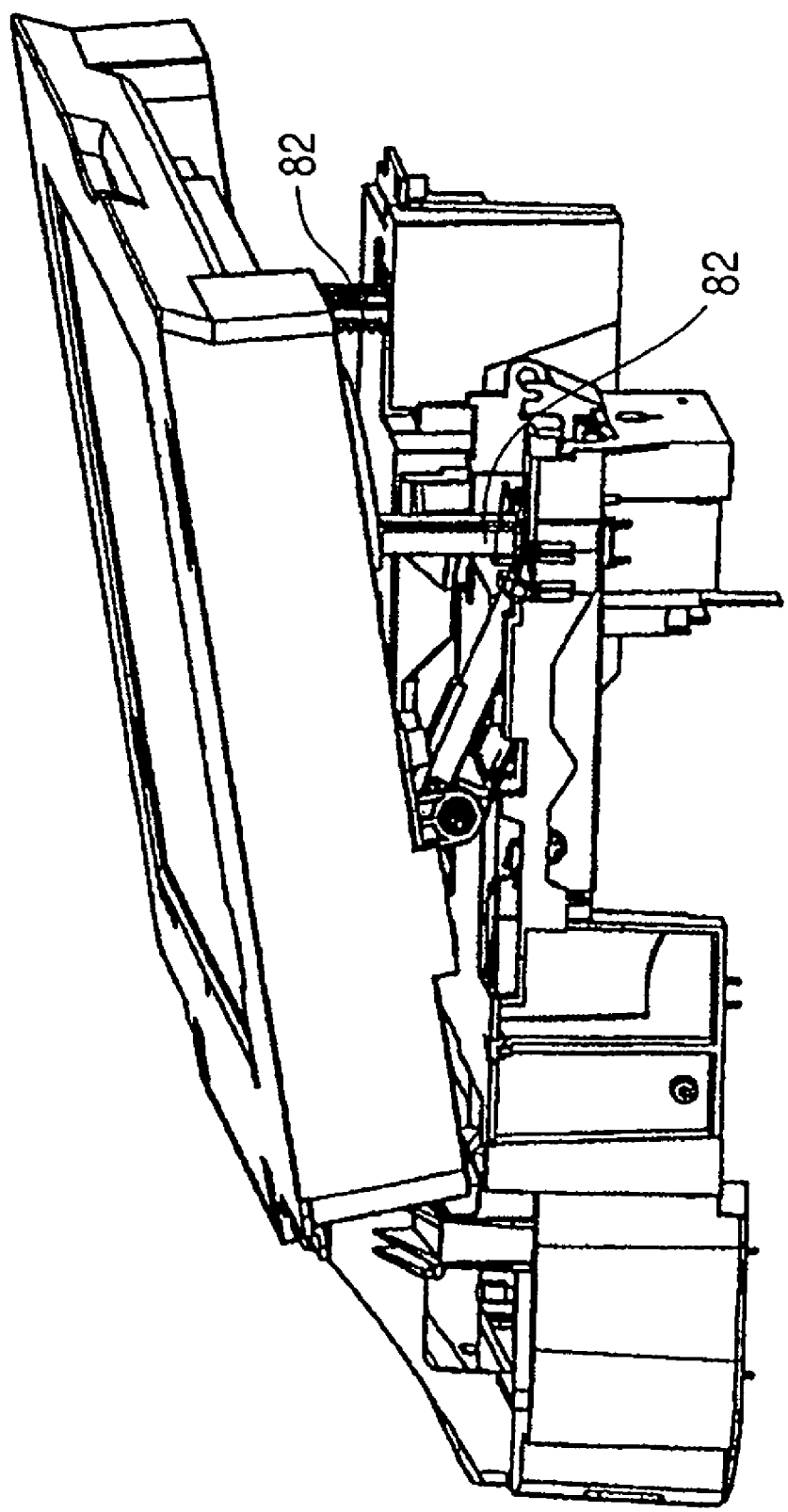
FIG. 17 illustrates the configuration of the damper unit in the embodiment of the invention.

FIG. 17 illustrates the configuration of the damper unit in the embodiment of the invention. This shows the state in the vicinity of the angle where the force of the damper unit 7 changes from upward to downward when the scanner unit 2 is to be closed. Thus, it illustrates the state in which the shaft part 72a of the damper arm is on the line Q shown in FIG. 15. In this state, the arm 82 is just in contact with the under side of the scanner unit 2. This configuration can serve to prevent with the anti-shock unit the scanner unit 2 from being abruptly compressed even if the scanner unit 2 is pulled downward by the damper unit 7. On the other hand, when the scanner unit 2 is lifted and opened, the lifting is not made heavy as the anti-shock unit does not act on the scanner unit 2.

Next, the recording unit 3 will be described. As shown in FIG. 2, recording sheets are fed in the direction of arrow C.

The recording sheets mounted on a mount unit are separated into single sheets by a sheet feed roller 34 and a separating roller 35, and fed. What is actually driven in this separating mechanism is the sheet feed roller 34, and the separating roller 35 is prevented from turning unless a torque of or above a certain level works in the turning direction. When a plurality of sheets of paper enter these paired rollers, the sheets can be fed one by one because the force to turn the separating roller is stronger than that to separate the sheets. The recording sheets separated by these paired rollers are carried between a feed roller 37a and a pinch roller 37b, and fed at a constant speed to an ink jet printing unit. A cartridge 39 performs recording on each recording sheet by moving in a direction perpendicular to the carried direction of the sheet guided by a guide shaft 134. The printed recording sheet is discharged by a pair of sheet discharge rollers 130 into a recorded sheet discharge tray 131. The sheet discharge tray 131 is automatically opened upon the start of recording operation. This arrangement can prevent the user from forgetting to open the sheet discharge tray 131 and invite jamming of recording sheets.

Whereas the ink jet recording system used in this embodiment is provided with means of generating thermal energy as energy for use in discharging ink (e.g. an electro-thermal converting member or a laser beam), and a printing device which generates variations in the state of ink with that thermal energy, such a system can help increase the density and fineness of recording.

Regarding the typical configuration and principle of such thermal energy generation, U.S. Pat. No. 4,723,129 and U.S. Pat. No. 4,740,796 disclose a basic principle which can be preferably used. While a system according to this principle can be applied to both the on-demand type and the continuous type, it can be applied with particular effectiveness to the on-demand type wherein an electro-thermal converter so arranged as to match paper sheets which hold liquid (ink) or a liquid path can be caused to generate thermal energy by applying at least one drive signal which gives a steep rise in temperature beyond the film boiling point, thereby to give rise to film boiling on the thermal acting face of the recording head and eventually to form bubbles in the liquid (ink) in one-to-one correspondence with the drive signal or signals. The growth and contraction of these bubbles causes the liquid (ink) to be discharged through a discharge port to form at least one drip. If this drive signal is shaped as a pulse, immediate and appropriate growth and contraction of these bubbles can be achieved, making it possible to discharge the liquid (ink) in a particularly responsive way, which is a more preferable result.

As such a pulse-shaped drive signal, what are described in U.S. Pat. No. 4,463,359 and U.S. Pat. No. 4,345,262 are suitable. Incidentally, use of the conditions stated in U.S. Pat. No. 4,313,124 regarding the temperature increase rate on the thermal acting face would make possible even superior recording.

The configuration of the recording head according to the present invention also covers, in addition to the combination of a discharge port, a liquid path and an electro-thermal converter (the liquid path either linear or bent at a right angle) described in the above-cited U.S. Patents, configurations in which the thermal acting face is arranged in a bent area disclosed in U.S. Pat. No. 4,558,333 and U.S. Pat. No. 4,459,600. In addition, the configuration may as well be based on Japanese Patent Application Laid-Open No. S59-0123670 disclosing a configuration in which a common slot for a plurality of electro-thermal converters is used as the discharge port of the electro-thermal converters and Japanese Patent Application Laid-Open No. S59-0138461 disclosing a configuration in which an opening to absorb the pressure wave of thermal energy is matched with the discharge port.

Further, for a full-line type recording head whose length matches the width of the large recording medium that the recording apparatus can record on, either a configuration which satisfies that length requirement by combining a plurality of recording heads as disclosed in the above-cited patents or a configuration of an integrally formed single recording head can be used.

In addition, a changeable chip type recording head which is enabled to be electrically connected to the apparatus body or to receive ink feeding from the apparatus body by being fitted to the apparatus body or a cartridge type recording head in which an ink tank is integrally provided may as well be used.

Adding restoring means for the recording head or precautionary auxiliary means provided as part of a recording device according to the present invention could further stabilize the advantages of the invention and therefore is preferable. Specific examples include capping means, cleaning means, pressurizing or suction means, or preheating means comprising an electro-thermal converter or some other heating element or a combination of these, provided for the recording head, or the execution of a pre-discharge mode separated from recording would also be effective in achieving stable recording.

Furthermore, as the recording mode of the recording device, not only a recording mode of a major color, such as black, but also integral configuration of a recording head or a combination of a plurality of recording heads would serve the purpose, but the apparatus may as well be provided for at least either a plurality of different colors or full color achieved by a mixture of colors.

The embodiment of the present invention can provide an image reading/recording apparatus which can prevent abrupt closing of the reading unit and enables the reading unit to be opened with less force.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-211223, filed Jul. 21, 2005, which is hereby incorporated by reference herein in its entirety.

What is claimed is:

1. An image reading/recording apparatus, comprising:
an apparatus body which remains stationary;
a scanner unit which is opened and closed by turning relative to said apparatus body;
an anti-shock unit which restricts the motions of said scanner unit when said scanner unit is closed relative to said apparatus body;
a damper unit of which a first part links with said apparatus body and of which a second part links with said scanner unit, said damper unit exerting a force in such a direction as to move said first part and said second part away from each other,
wherein the force works on said scanner unit
in a first direction away from said apparatus body, when an angle opening from said apparatus body to said damper unit is larger than a predetermined angle, and
in a second direction opposite the first direction and towards said apparatus body, when the angle opening is smaller than the predetermined angle; and
a metal supporting member which is arranged in said apparatus body, wherein
in a state where said scanner unit is closed relative to said apparatus body, said metal supporting member is in direct contact with said first and second parts of said damper unit, and
in a state where said scanner unit is opened relative to said apparatus body, said metal supporting member is separated from said second part of said damper unit.

2. The image reading/recording apparatus according to claim 1, wherein said anti-shock unit comes into contact with said scanner in the vicinities of the position where the angle opening from said apparatus body to said damper unit is the predetermined angle.

3. The image reading/recording apparatus according to claim 1, wherein a center of turning of said scanner unit relative to said apparatus body, said second part of said damper unit and said first part of said damper unit are aligned at the predetermined angle.

4. The image reading/recording apparatus according to claim 1, further comprising an ink jet recording head capable of discharging ink for performing recording on recording paper sheets.

5. The image reading/recording apparatus according to claim 4, wherein said ink jet recording head is equipped with an electro-thermal converting member which generates thermal energy utilized for the discharge of ink.

* * * * *